United States Patent [19]
Hammond

[11] 3,756,272
[45] Sept. 4, 1973

[54] FUSE ASSEMBLY

[75] Inventor: Harry H. Hammond, Middleburg Heights, Ohio

[73] Assignee: The Hansen Manufacturing Company, Cleveland, Ohio

[22] Filed: Feb. 17, 1972

[21] Appl. No.: 227,154

[52] U.S. Cl............ 137/498, 137/504, F16k/17/24
[51] Int. Cl......................................... F16k 31/363
[58] Field of Search.................. 137/504, 498, 460; 251/15

[56] References Cited
UNITED STATES PATENTS

| | | | |
|---|---|---|---|
| 2,411,392 | 11/1946 | Saville | 137/498 |
| 2,781,775 | 2/1957 | Merrill | 137/498 |
| 3,060,958 | 10/1962 | Hedland | 137/504 X |
| 3,015,341 | 1/1962 | Hedland et al. | 137/504 X |
| 2,224,216 | 12/1940 | Coberly | 137/504 |
| 3,156,262 | 11/1964 | Attebo | 137/504 X |
| 3,496,962 | 2/1970 | Tuzson | 137/504 |

Primary Examiner—Henry T. Klinksiek
Assistant Examiner—Robert J. Miller
Attorney—J. Herman Yount, Jr. et al.

[57] ABSTRACT

An improved fuse assembly is used in association with a fluid conduit to prevent excessive fluid flow through the conduit. The fuse assembly includes a body having an inlet connected with an upstream fluid conduit and an outlet connected with a downstream fluid conduit. If the downstream fluid conduit should rupture or the associated equipment malfunction so that there is a large pressure differential across the fuse assembly, a valve in the fuse assembly will move to a closed position blocking fluid flow through the fuse body. A bleed passage is provided through the valve to enable fluid to flow from the upstream side of the valve to the downstream side at a slow rate when the valve is closed to enable the valve to automatically open when the malfunction which tended to cause the excessive fluid flow has been corrected.

11 Claims, 6 Drawing Figures

PATENTED SEP 4 1973 3,756,272

FUSE ASSEMBLY

This invention relates generally to a valve and more particularly to a fuse assembly for preventing excessive flow of fluid through a conduit.

During the use of air and hydraulically activated equipment, the rupturing of a fluid conduit or the malfunction of associated equipment can result in an excessive fluid flow through the conduit. In addition to being wasteful, this excessive fluid flow can be dangerous to any operating personnel who happen to be in the area. The present invention provides a fuse assembly for preventing excessive fluid flow through a conduit due to either a rupturing of the conduit or a malfunction of associated equipment.

A fuse assembly constructed in accordance with the present invention includes a tubular fuse body defining a longitudinally extending valve chamber. A valve member is disposed in the valve chamber and is biased to an open position by a spring to thereby enable fluid to flow through the fuse body. Upon the occurrence of a predetermined pressure differential across the valve member, due to either a rupturing of a conduit or malfunction of associated equipment, the valve member moves to a closed position blocking fluid flow through the fuse body. Once the malfunction which tended to induce excessive fluid flow has been corrected, the valve member is automatically moved to the open position under the influence of the biasing spring. The valve member is advantageously formed of an integrally molded piece having a resiliently deformable end portion which engages a stop ring in the valve body to limit axial movement of the valve member.

Accordingly, it is an object of this invention to provide a new and improved fuse assembly formed of relatively inexpensive components which are readily assembled and which is reliable in operation in many different types of environments.

Another object of this invention is to provide a new and improved fuse assembly for use in association with a fluid conduit to prevent excessive fluid flow through the conduit and wherein the fuse assembly includes a valve which is movable from an open position to a closed position against the influence of a biasing spring in response to the occurrence of a predetermined pressure differential across the valve to block fluid flow through the fuse assembly.

Another object of this invention is to provide a new and improved fuse assembly as set forth in the next preceeding object and wherein a bleed passage is provided for enabling fluid to flow from the upstream side of a valve to the downstream side of the valve when it is in the closed position to reduce the pressure differential across the valve and enable the valve to automatically open under the influence of the biasing spring when the cause of excessive fluid flow has been corrected.

Another object of this invention is to provide a new and improved fuse assembly which is used in association with a fluid conduit to prevent excessive fluid flow through the conduit and wherein the fuse assembly includes a tubular fuse body which defines a longitudinally extending valve chamber holding a valve which is movable from an open position enabling fluid to flow through the fuse body to a closed position blocking fluid flow in response to a predetermined pressure differential across the valve member, the valve member being provided with a stop element which limits axial movement of the valve member and is resiliently deformable to facilitate assembly of the fuse.

These and other objects and features of the present invention will become more apparent upon a consideration of the following description taken in connection with the accompanying drawings wherein.

Figure 1:
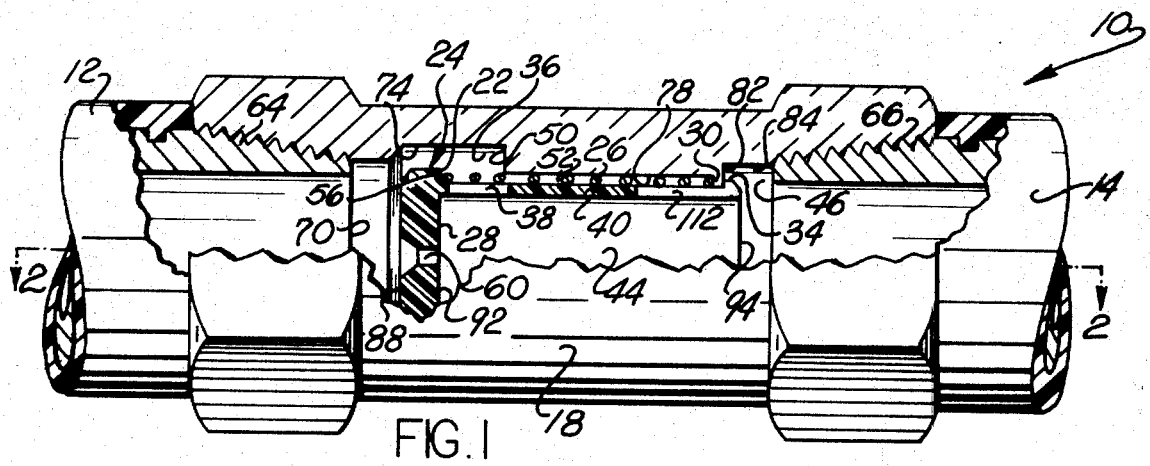
FIG. 1 is a partially broken away view of a fuse assembly constructed in accordance with the present invention.

An improved fuse assembly 10 constructed in accordance with the present invention prevents excessive fluid flow from an upstream fluid conduit 12 to a downstream fluid conduit 14. The fuse assembly 10 includes a longitudinally extending body 18 formed of steel or other suitable material. A valve member 22 is disposed in a valve chamber 24 formed in the body 18. The valve member 22 is urged to the open position shown in FIGS. 1 and 2 by a helical biasing spring 26 which is disposed between a circular head 28 formed on an upstream end of the valve member 22 and an annular stop ring 30 formed in the valve body 18. The interaction between the spring 26, valve head 28 and stop ring 30 presses arcuate stop segments 34 disposed in a ring on the downstream end of the valve member 22 against the stop ring to retain the valve member in the open position.

During normal operation of the equipment associated with the fuse assembly 10, fluid flows from the conduit or hose 12 into an inlet portion 36 of the valve chamber 24. The fluid then flows radially inwardly through openings 38 disposed on opposite sides of a cylindrical wall 40 of the valve member 22. The fluid then flows axially along a cylindrical passage 44 (see FIG. 1) formed in the valve member 22 to an outlet portion 46 of the valve chamber. Of course, the fluid then flows from the outlet portion 46 of the valve chamber 24 to the downstream conduit or hose 14.

In the event there is a rupturing of the conduit 14 or a malfunction of associated equipment, fluid will flow relatively freely through the conduit 14 so that a relatively large pressure differential is induced across the valve member 22. When this occurs, the relatively high pressure fluid in the upstream conduit 12 presses against the head 28 of the valve member 22 and moves the valve member from the open position of FIGS. 1 and 2 to the closed position of FIG. 3. The closed valve member 22 blocks fluid flow through the fuse assembly 10 to thereby prevent the occurrence of excessive fluid flow, which could be dangerous to operating personnel as well as wasteful.

Figure 2:
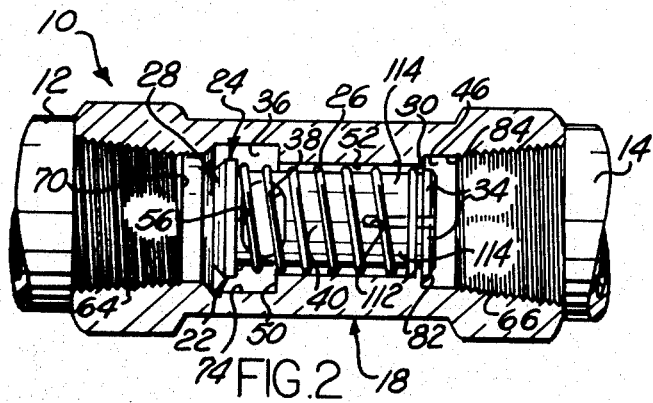
FIG. 2 is a sectional view, taken on reduced scale along the line 2—2 of FIG. 1, illustrated the relationship between a body of the fuse assembly and a valve member which is in an open position.
Figure 3:
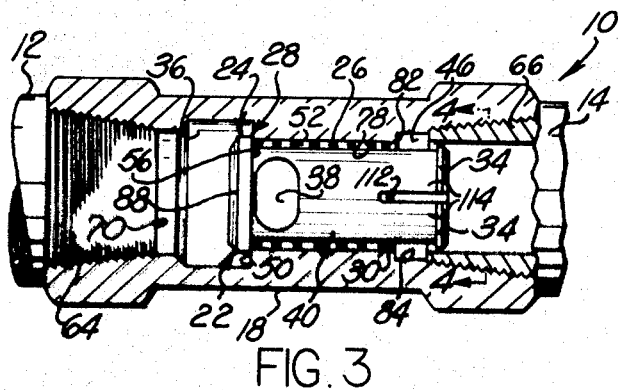
FIG. 3 is a sectional view, generally similar to FIG. 2, illustrating the valve member in a closed position.

When the valve member 22 moves from the open position of FIG. 2 to the closed position of FIG. 3, the helical coil spring 26 is compressed between the valve head 28 and stop ring 30 as the valve head 28 approaches an annular valve seat 50. The valve seat 50 is formed on an inwardly projecting shoulder between the relatively large diameter inlet portion 36 of the valve chamber 24 and a smaller diameter intermediate portion 52 of the valve chamber in which the spring 26 is disposed. When the valve member 22 is in the closed position, sealing engagement between an annular downstream valve surface 56 on the valve head 28 and the valve seat 50 prevents fluid from flowing around the circular valve head into one of the two oppositely disposed openings 38 in the side wall 40 of the valve 22.

After the malfunction which induced the relatively large pressure differential across the valve 22 has been corrected, the valve 22 is automatically opened to enable normal operation of the equipment associated with the downstream conduit 14 to be resumed. To promote this automatic opening of the valve 22, a relatively small bleed passage 60 is formed in the center of the valve head 28. This small bleed passage enables relatively high pressure fluid to bleed, i.e., flow at a very restricted rate, from the upstream side of the valve head 28, through the cylindrical passage 44 to the downstream conduit 14 to thereby reduce the pressure differential across the valve 22. After this flow has been continued for a period of time, the pressure differential across the valve 22 is sufficiently small to enable the biasing spring 26 to initiate movement of the valve 22 from the closed position of FIG. 3 toward the fully open position of FIGS. 1 and 2. As the valve 22 begins to move from the closed position toward the open position, fluid flow through the opposing inlets 38 in the side wall 40 of the valve quickly reduces the pressure differential across the valve to enable the valve to move quickly to the open position. As the valve 22 reaches the open position, the arcuate stop elements 34 on the downstream end of the valve 22 move into abutting engagement with the annular stop ring 30 to limit axial movement of the valve 22 in the upstream direction under the influence of the biasing spring 26.

Although it is contemplated that many different types of materials could be used, the fuse body 18 is machined from steel and has threaded end portions 64 and 66 which engage externally threaded ends of the conduits 12 and 14. The threaded end portion 64 ends at a circular inlet opening 70 through which fluid flows into the inlet portion 36 of the valve chamber 24. The inlet portion 36 of the valve chamber 34 is formed by a cylindrical surface 74 which is disposed in a coaxial relationship with the circular head 28 and cylindrical side wall 40 of the valve 22. The radially extending valve seat 50 connects the cylindrical wall 74 of the inlet portion 36 of the valve chamber 24 sith a cylindrical wall 78 of the intermediate portion 52 of the valve chamber 24. The stop ring 30 projects radially inwardly from the wall 78 to enable the spring 26 to be entrapped between the stop ring and the circular head 28 of the valve 22. The stop ring 30 has a radially extending surface 82 which is abuttingly engaged by the stop segments 34 to limit the travel of the valve 22 in the open position of FIGS. 1 and 2. This radially extending stop surface 82 terminates in a cylindrical surface 84 which partially defines the outlet portion 46 of the valve chamber 24. The coaxial arrangement of circular surfaces to form the valve chamber 24 facilitates construction of the fuse body 18.

Although it is contemplated that the valve 22 could be formed of separate elements which are joined together, the valve 22 is advantageously molded as an integral unit of a resilient plastic material. When the valve 22 is disposed in the valve chamber 24, a circular upstream surface 88 on the valve head 28 is disposed in a coaxial relationship with and extends perpendicular to the longitudinal axis of the fuse body 18. The openings 38 have major axes which extend circumferentially around the tubular side wall 40 and minor axes which extend axially along the tubular side wall. This elongated configuration of the openings 38 enables the area of the openings to be disposed upstream of the valve seat 50 when the valve 22 is in the open position (see FIG. 2) to facilitate a flow of fluid from the inlet portion 36 of the valve chamber 24 to the axially extending cylindrical passage 44 formed within the valve member. The passage 40 extends from a circular inner surface 92 on the valve head 28 to a circular outlet opening 94 at the downstream end of the valve member (see FIG. 1).

Figure 4:
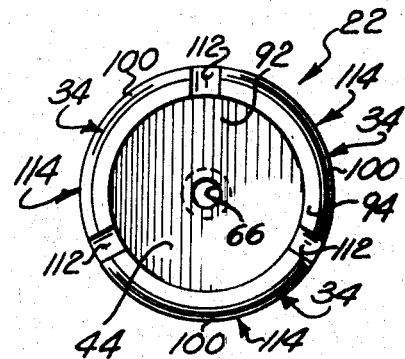
FIG. 4 is an end view, taken on an enlarged scale along the line 4—4 of FIG. 3, further illustrating the construction of the valve member.
Figure 5:
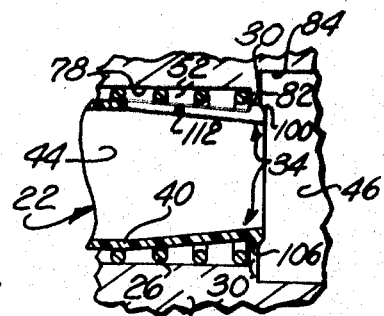
FIG. 5 is a fragmentary sectional view illustrating a step in the assembling of the fuse assembly of FIG. 1.
Figure 6:
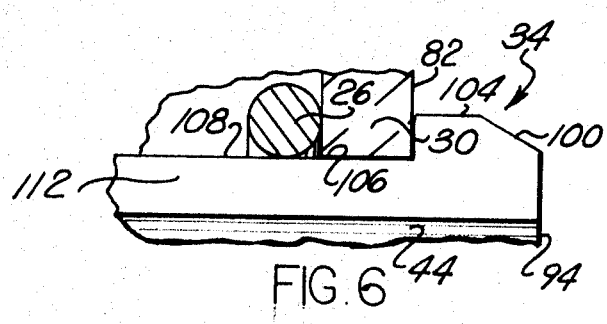
FIG. 6 is a fragmentary sectional view illustrating the relationship between a stop segment on the valve member and a stop ring on the body of the fuse assembly when the valve member is in the open position of FIG. 2.

To facilitate assembly of the valve member 22 in the fuse body 18, the arcuate stop segments 34 on the downstream end of the valve 22 can be radially compressed inwardly from their normal position, shown in FIGS. 2 through 4 to the position shown in FIG. 5. When compressed inwardly, the stop elements 34 can move axially through the circular area defined by the interior of the stop ring 30 to enable the valve 22 to be inserted into the fuse body 18. Thus during construction of the fuse assembly 10, the valve member 22 and spring 26 are moved through the inlet 70 to bring angularly disposed cam surfaces 100 (FIG. 6) on the stop segments 34 into abutting engagement with an upstream corner of the stop ring 30. As the valve member 22 is pressed against the stop ring 30, the cam surfaces 100 force the stop segments 34 radially inwardly until a cylindrical nose surface 104 on the stop segments 34 is disposed in abutting engagement with a cylindrical inner surface 106 of the stop ring 30 (FIG. 5). Continued axial movement of the valve 22 slides the surfaces 104 on the stop segments 34 axially downstream past the stop ring 30. This releases the stop segments 34 so that they can spring radially outwardly to move a cylindrical surface 108 of the side wall 40 into abutting engagement with the cylindrical inner surface 106 of the stop ring 30 (see FIG. 6).

The cylindrical body 40 of the valve 22 is provided with a plurality of axially extending slots 112 which divide the tubular side wall 40 into a plurality of resilient legs 114 on which the stop segments are disposed in a circle (see FIG. 4). Since the stop segments 34 are separated by the slots 112, the legs 114 can be readily compressed inwardly by the camming action of the surface 100 against the stop ring 30 as the valve 22 is inserted into the fuse body 18.

In view of the foregoing description, it can be seen that the fuse assembly 10 is relatively uncomplicated in construction to promote reliable operation and to tend to minimize manufacturing costs. The fuse assembly 10 includes a body 18 which defines a valve chamber 24 in which the valve 22 is disposed in a coaxial relationship. Upon the occurrence of a predetermined pressure differential across the valve 22, fluid pressure against the downstream surface 88 on the valve head 28 moves the valve 22 from the open position of FIGS. 1 and 2 to the closed position of FIG. 3 against the influence of the biasing spring 26.

The valve 22 is automatically returned to the open position when the defect which resulted in the occurrence of the relatively large pressure differential across the valve is corrected. To provide for this automatic opening of the valve 22, a bleed passage 60 is formed in the valve head 28 to enable fluid to flow from the upstream side of the valve head to the downstream side of the valve head to reduce the pressure differential across the valve. It should be understood that the passage 60 is restricted and has a relatively small throat diameter so that a very low rate of fluid flow is provided across the closed valve 22 so that the valve blocks almost all fluid flow through the fuse body 18 when the valve is in the closed position of FIG. 3.

Having described a specific preferred embodiment of the invention, the following is claimed:

1. A fuse assembly for use in association with a fluid conduit to prevent excessive fluid flow through the conduit, said fuse assembly comprising a fuse body adapted to be connected with the conduit, valve means disposed in said fuse body for blocking fluid flow through said fuse body in response to the occurrence of a predetermined pressure differential across said valve means, said valve means being movable relative to the fuse body under the influence of the predetermined pressure differential from an open position enabling fluid to flow through said fuse body to a closed position blocking fluid flow through said fuse body, and spring means disposed in said fuse body for biasing said valve means toward the open position, said fuse body including a first stop ring which circumscribes said valve means, said valve means including a second stop ring disposed downstream of said first stop ring and having an external diameter which is greater than an internal diameter of said first stop ring, said first and second stop rings being urged into abutting engagement with each other under the influence of said spring means when said valve means is in the open position, said second stop ring being disposed downstream of said first stop ring when said valve means is in the closed condition, said valve means including resilient means for enabling said second stop ring to be radially compressed to an external diameter which is no greater than the internal diameter of said first stop ring to enable said second stop ring to be moved through said first stop ring from a position upstream of said first stop ring to a position downstream of said first stop ring during assembly of the fuse assembly.

2. A fuse assembly for use in associate with a fluid conduit to prevent excessive fluid flow through the conduit, said fuse assembly comprising a fuse body adapted to be connected with the conduit, valve means disposed in said fuse body for blocking fluid flow through said fuse body in response to the occurrence of a predetermined pressure differential across said valve means, said valve means being movable relative to the fuse body under the influence of the predetermined pressure differential from an open position enabling fluid to flow through said fuse body to a closed position blocking fluid flow through said fuse body, and spring means disposed in said fuse body for biasing said valve means toward the open position, said valve means including a hollow valve body having a longitudinally extending side wall, means defining an inlet opening in said side wall for enabling fluid to flow transversely through side wall from the exterior to the interior of said hollow valve body when said valve means is in the open position and a valve head disposed on an upstream end portion of said valve body and projecting transversely outwardly of said longitudinally extending side wall, said fuse body including means for defining a valve seat circumscribing said valve body, said valve body being spaced from said valve seat when said valve means is in the open position to enable fluid to flow around said valve head and through said inlet opening and hollow valve body to a location downstream of said valve means, said valve head being disposed in abutting engagement with said valve seat when said valve means is in the closed position to block fluid flow around said valve head to said inlet opening.

3. A fuse assembly as set forth in claim 1 further including bleed means for enabling fluid to flow at a very low rate from the upstream side of said valve means to the downstream side of said valve means when said valve means is in the closed position to tend to reduce the pressure differential across said valve means and enable said valve means to be moved from the closed position to the open position under the influence of said spring means.

4. A fuse assembly as set forth in claim 2 wherein said spring means includes a coil spring circumscribing said side wall of said valve body and extending between said valve head and said fuse body for urging said valve means to the open position.

5. A fuse assembly as set forth in claim 2 wherein said fuse body further includes a first stop ring which circumscribes said valve means, said valve means including a second stop ring disposed downstream of said first stop ring and having an external diameter which is greater than an internal diameter of said first stop ring, said first and second stop rings being urged into abutting engagement with each other under the influence of said spring means when said valve means is in the open position, said second stop ring being disposed downstream of said first stop ring when said valve means is in the closed condition.

6. A fuse assembly as set forth in claim 5 wherein said valve means includes resilient means for enabling said second stop ring to be radially compressed to an external diameter which is no greater than the internal diameter of said first stop ring to enable said second stop ring to be moved through said first stop ring from a position upstream of said first stop ring to a position downstream of said first stop ring during assembly of the fuse assembly.

7. A fuse assembly as set forth in claim 2 further including passage means extending through said valve head for enabling fluid to flow through said valve head when said valve means is in the closed position to tend to reduce a pressure differential across said valve head and enable said valve means to move from the closed position to the open position under the influence of said spring means.

8. A fuse assembly for use in association with a fluid conduit to prevent excessive fluid flow through the conduit, said fuse assembly comprising a tubular fuse body member defining a longitudinally extending valve chamber having an inlet at an upstream end portion of said fuse body member and an outlet at a downstream end portion of said fuse body member, said valve chamber including an inlet portion extending downstream from said inlet and having a first cross sectional area in a first transverse plane, an intermediate portion extending downstream from said inlet portion and having a second cross sectional area which is smaller than said first cross sectional area in a second transverse plane which is disposed downstream of and extends parallel to said first transverse plane, surface means for forming a valve seat adjacent to the junction between said inlet and intermediate portions, a stop element at a downstream end of said intermediate portion and having a third cross sectional area which is smaller than said second cross area in a third transverse plane which is disposed downstream of and extends parallel to said second transverse plane, and an outlet portion extending downstream from said stop element to said outlet and having a fourth cross sectional area which is larger than said third cross sectional area in a fourth plane which is disposed downstream of and extends parallel to said third plane, said fuse assembly further including valve means disposed in said valve chamber and movable from an open position enabling fluid to flow through said fuse body to a closed position blocking fluid flow through said fuse body in response to a predetermined pressure differential across said valve means, said valve means including a head portion disposed in said inlet portion of said valve chamber and having a transverse cross sectional area in a plane extending parallel to said first plane which is smaller than said first cross sectional area and larger than said second cross sectional area, said valve head portion being disposed upstream of said valve seat when said valve means is in the open position and being disposed in sealing engagement with said valve seat when said valve means is in the closed position, a valve body connected with and extending downstream of said head portion through said stop element and intermediate portion of said valve chamber and having a cross sectional area in a plane extending parallel to said second plane which is smaller than said third cross sectional area, and stop means connected with a downstream end portion of said valve body and having a cross sectional area in a plane extending parallel to said second plane which is larger than said third cross sectional area and smaller than said fourth cross sectional area, said stop means being disposed in abutting engagement with a downstream surface of said stop element when said valve means is in the open position and being spaced from said stop element when said valve means is in the closed position, said valve body including a tubular wall connected with said head portion and defining a longitudinally extending central passage which is connected in fluid communication with said outlet portion and a transversely extending inlet opening to said central passage, said inlet opening being at least partially disposed in said inlet portion of said valve chamber when said valve means is disposed in the open position to enable fluid to flow from said inlet portion of said valve chamber through said inlet opening and central passage to said outlet portion of said valve chamber, said inlet opening being disposed in said intermediate portion of said valve chamber when said valve means is in the closed position to block fluid flow through said inlet opening by sealing engagement of said head portion with said valve seat.

9. A fuse assembly as set forth in claim 8 further including spring means circumscribing said valve body and extending between said head portion of said valve means and said stop element for urging said valve means to the open position.

10. A fuse assembly as set forth in claim 9 wherein said valve body includes resilient means for enabling said stop means to be compressed inwardly to a cross-sectional area which is at most equal to said third cross-sectional area to facilitate assembling of said fuse assembly.

11. A fuse assembly as set forth in claim 9 further including passage means extending through said heat portion for enabling fluid to flow from ustream of said head portion through said passage means and central passage to said outlet portion of said valve chamber to tend to reduce the pressure differential across said valve means and enable said spring means to move said valve means to the open position when said valve means is in the closed position.

* * * * *